Aug. 4, 1959

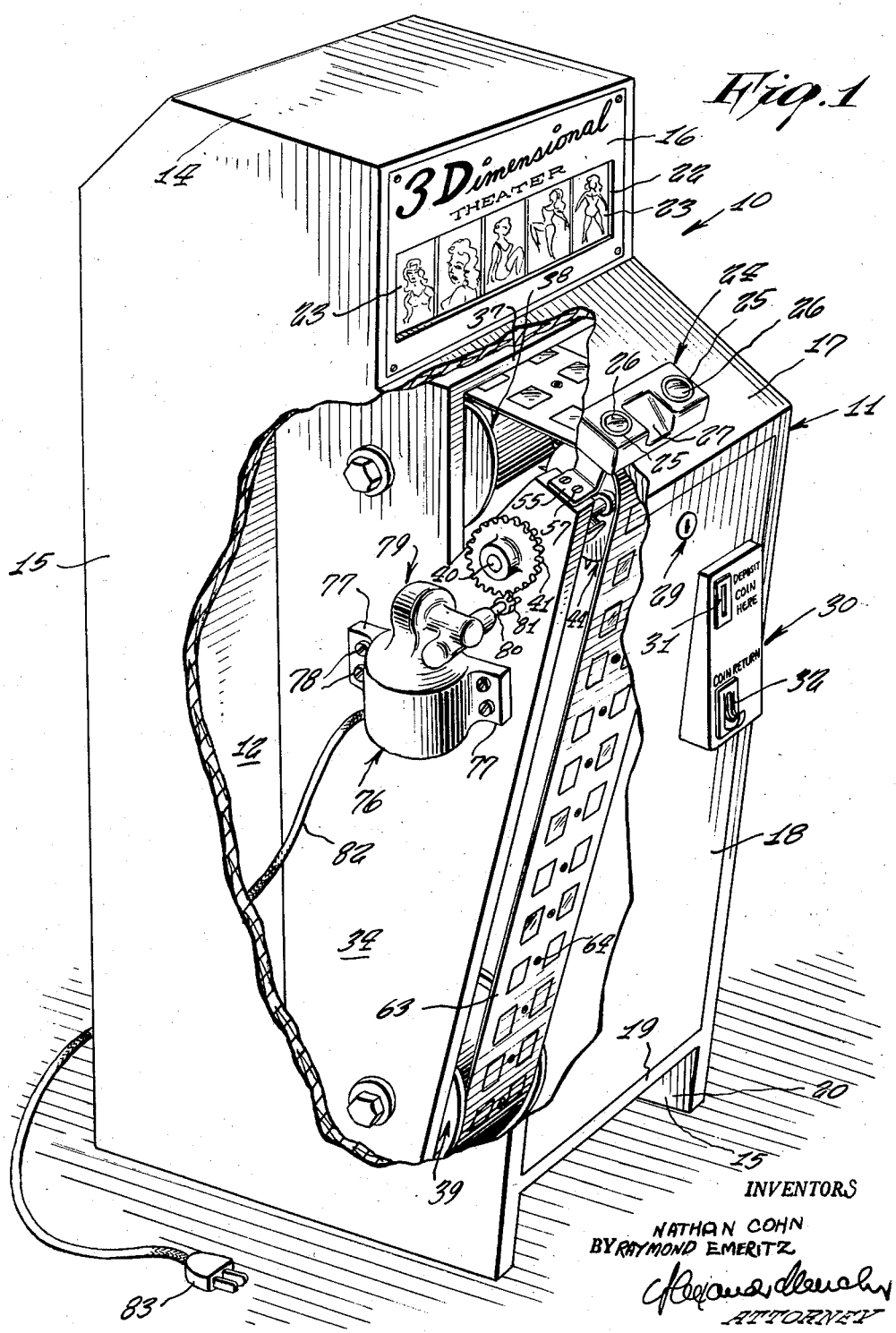

N. COHN ET AL 2,897,721

STEREOSCOPIC VIEWER

Filed Dec. 28, 1953

INVENTORS
NATHAN COHN
RAYMOND EMERITZ
BY
ATTORNEY

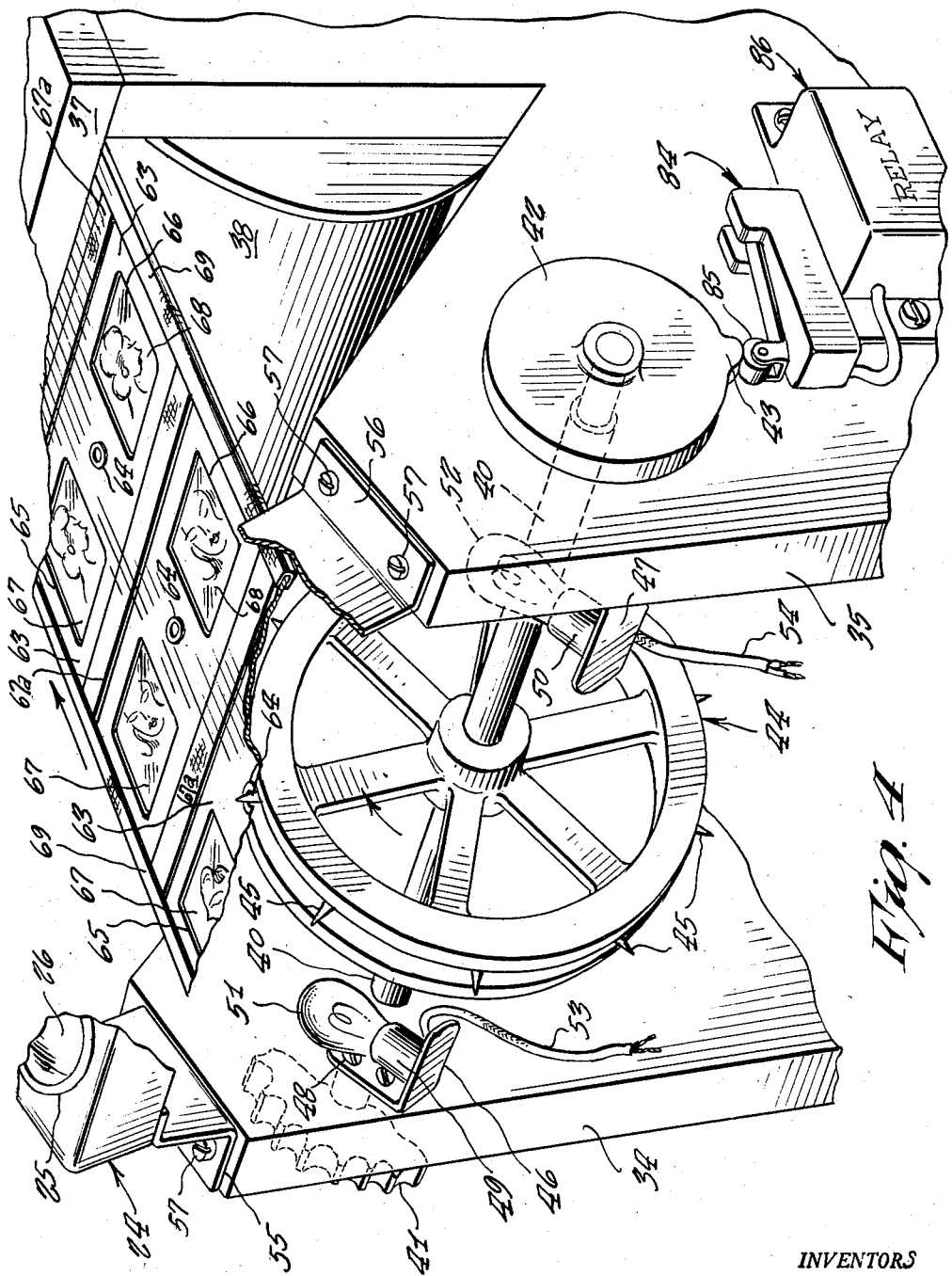

Aug. 4, 1959   N. COHN ET AL   2,897,721
STEREOSCOPIC VIEWER
Filed Dec. 28, 1953   4 Sheets-Sheet 4
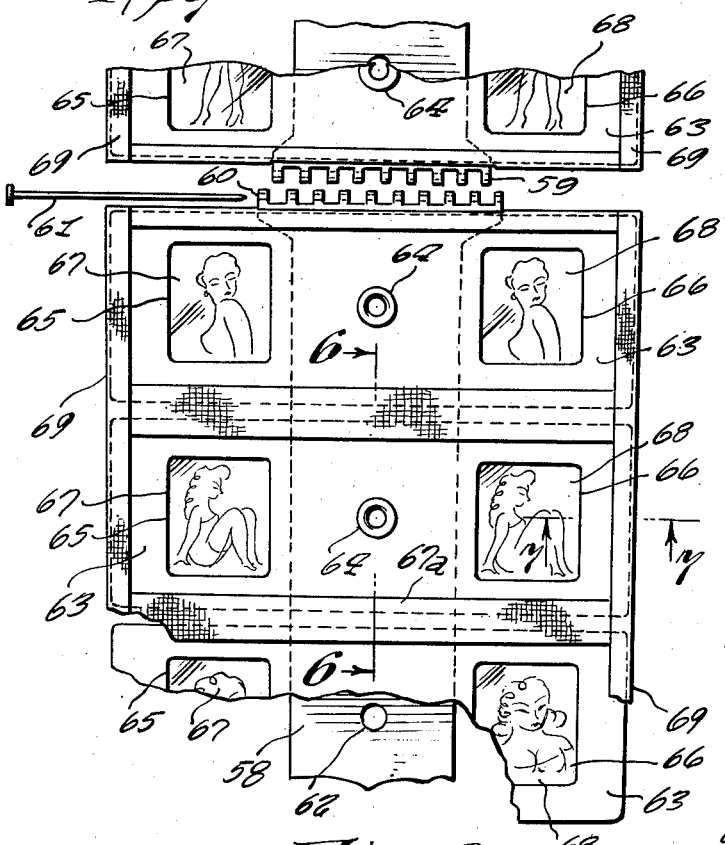
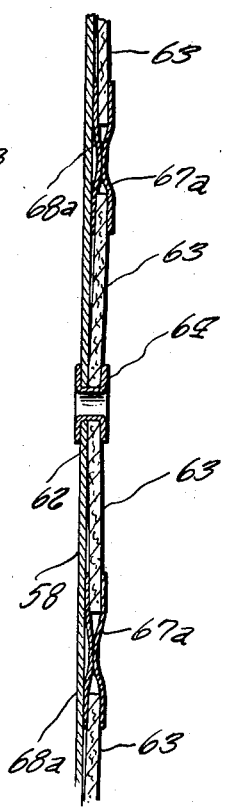
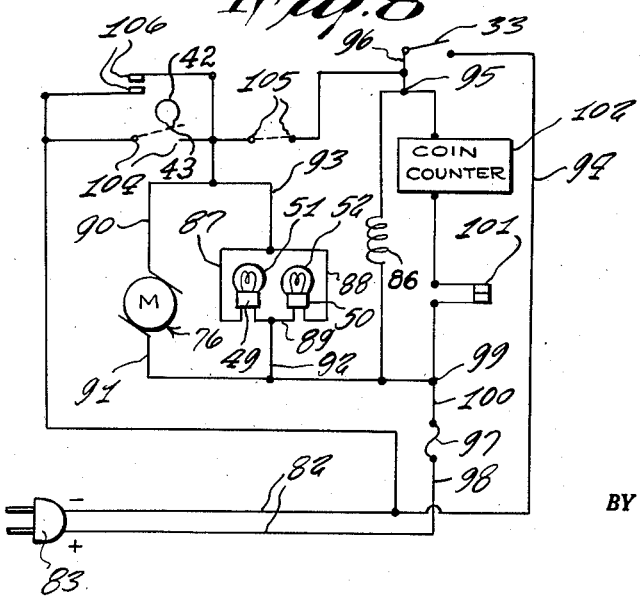
INVENTORS
NATHAN COHN
BY RAYMOND EMERITZ
ATTORNEY United States Patent Office 2,897,721
Patented Aug. 4, 1959

2,897,721
STEREOSCOPIC VIEWER

Nathan Cohn, Lawrence, and Raymond Emeritz, Levittown, N.Y., assignors of fifty percent to Camera Services, Inc., a corporation of New York, and fifty percent to Rite Way Sales and Mfg. Co. Inc., a corporation of New York, both of New York, N.Y.

Application December 28, 1953, Serial No. 400,673

9 Claims. (Cl. 88—31)

This invention relates to stereoscopic viewers.

The main object of the invention resides in the provision of a stereoscopic viewer for use in penny arcades or the like which is completely automatic in operation.

A further object of the invention resides in the provision of a stereoscopic viewer which is easy to service.

A further object of the invention resides in the provision of a stereoscopic viewer which is both foolproof and troubleproof.

A further object of the invention resides in the provision of a stereoscopic viewer adapted for use in penny arcades or the like which is electronically coin operated and which mounts five complete one minute showings of brilliant natural color, three dimensional pictures.

A further object of the invention resides in the provision of a stereoscopic viewer which is sturdy and durable in construction, reliable and efficient in operation, and inexpensive to manufacture and assemble.

For other objects and a better understanding of the invention, reference may be made to the following detailed description taken in connection with the accompanying drawing, in which:

Figure 1 is a perspective view of a stereoscopic viewer embodying the features of the present invention, shown partly broken away to show the interior construction thereof;

Fig. 2 is a vertical sectional view taken longitudinally through the device;

Fig. 3 is a transverse sectional view taken along the line 3—3 of Fig. 2;

Fig. 4 is a fragmentary perspective view of a portion of the device;

Fig. 5 is a fragmentary plan view showing the novel belt means for mounting the stereoscopic slides and forming a part of the present invention;

Fig. 6 is a vertical sectional view taken along the line 6—6 of Fig. 5;

Fig. 7 is a fragmentary transverse sectional view taken along the line 7—7 of Fig. 5; and Fig. 8 is a circuit diagram of the device.

Referring now more in detail to the drawing, and more particularly to Fig. 1, there is generally indicated at 10 the stereoscopic viewer including an upstanding hollow housing 11, substantially as illustrated.

The housing 11 includes a vertical rear wall 12, a bottom wall 13, top wall 14 and side walls 15. The front of the housing includes the top vertical panel 16, the downwardly and forwardly sloping viewing panel 17 and the downwardly and rearwardly sloping front panel 18. The bottom edge of the panel 18, it will be noted, rests upon a transverse support 19 vertically spaced above the bottom 13 (Fig. 2) providing a convenient space 20 into which the shoes of the viewer are received. A vertical panel 21 connects the inner edge of the support 19 with the forward edge of the bottom wall 13.

The top front panel 16 is provided with suitable advertising material and may include the window 22 in which are disposed the plurality of photographs 23, each of which corresponds to one of the showings within.

A stereoscopic viewing head 24 is mounted on the viewing panel 17 and includes the usual pair of tubes 25 which extend through the panel 17, a lens 26 being mounted in the outer end of each of the tubes 25. The viewing head 24 also includes the suitable nose cut out 27. When standing in front of the viewer with the shoes of the viewer received within the space 20, the person using the viewer will look through the head 24 with one eye looking through each of the lenses 26.

The front panel 18 is removable and is hingeably mounted along its lower edge upon a transverse beam 28 (Fig. 2), the upper portion of the panel being secured within the housing by means of a cylinder lock 29. By means of the outwardly opening panel 18, servicing and repair of the interior of the device is facilitated with a minimum of time and effort. Only authorized persons will, of course, be provided with keys for opening the cylinder lock 29.

A conventional coin receiving mechanism 30 is mounted in the front panel 18 and includes the usual coin receiving slot 31 and coin return slot 32, the mechanism 30 also including an internal electrical switch 33 (Fig. 8) which is closed momentarily whenever a coin is deposited within the slot 31.

Within the housing 11 and freely spaced from the side walls 15 thereof, a pair of laterally spaced, vertical members 34 and 35 (Fig. 4) are mounted upon a support 36 which is in turn mounted upon the bottom wall 13 behind the panel 21, the front edges of the members 34 and 35 being substantially parallel to the panel 18. The rear upper edges of the members 34 and 35 are connected by a top portion 37 below which is rotatably mounted in suitable manner an idler guide drum 38 (Figs. 1, 2 and 3). A bottom idler guide drum 39 is also rotatably mounted in suitable manner between the members 34 and 35.

A transverse shaft 40 is rotatably mounted in suitable manner between the members 34 and 35 in front of the top idler guide drum 38, the opposite ends of the shaft 40 extending outwardly beyond the members 34 and 35. A gear 41 is keyed onto the end of shaft 40 adjacent the outer face of the member 34, while a disc 42 is keyed onto the other end of the shaft 40 adjacent the outer face of member 35, the disc 42 being provided on its periphery with a cam 43 for a purpose which will hereinafter become clear.

A belt transport sprocket 44 is keyed onto the shaft 40 midway between the members 34 and 35, the belt transport sprocket 44 carrying around its periphery ten outwardly extending points 45, also for a purpose which will hereinafter become clear.

L-shaped brackets 46 and 47 are secured to the inner faces of the members 34 and 35, respectively, by means of wood screws 48, the brackets 46 and 47 serving to mount electric lamp sockets 49 and 50 within which are screwed the electric lamps 51 and 52. The lamps 51 and 52 are connected in the electric circuit of the device by means of the insulated wires 53 and 54 (Fig. 4).

The viewing head 24 is supported on Z-shaped brackets 55 and 56 secured to the forward upper edges of the members 34 and 35 by means of the wood screws 57.

An improved and novel stereoscopic picture mounting belt is provided and includes a central brass transport belt 58 (Figs. 5 and 6), the opposite ends of which are formed with the laterally spaced, cooperating loops 59 and 60 which intermesh and are releasably secured together by means of a nail 61 or the like to form an endless belt. The belt 58 is provided with central longitudinally spaced openings 62 (Fig. 5) by means of which a plurality of stereoscopic card mounts 63 are secured thereto with grommets 64. Each of the mounts 63 is provided with the usual windows 65 and 66 within which are mounted the stereoscopic pictures 67 and 68. It will be noted that the adjacent lateral edges of the mounts 63 are freely spaced from each other. These adjacent spaces are bridged on each side by lateral strips of adhesive 67a and 68a (Fig. 6), while continuous strips of adhesive 69 are applied along each longitudinal edge of the belt overlapping the opposite ends of the transverse strips 67a, 68a, and forming a smooth continuous belt. Preferably fifty mounts 63 are provided, in sets of ten each, providing five different showings.

It will be noted that the belt extends around the idler guide drums 38 and 39 with the grommets 64 successively receiving the points 45 of the belt transport sprocket 44, as shown in Fig. 4.

A belt tensioning mechanism is provided and includes a roller 70 having extensions 71 at each end which are rotatably mounted within elongated, horizontal slots 72 provided in the members 34 and 35. The extensions 71 external of the members 34 and 35 are provided with annular grooves 73 within which are secured the rear ends of springs 74, the forward ends of the springs 74 being secured to nails or other fastening means 75 provided on the outer faces of the members 34 and 35 (Fig. 3). Thus the roller 70 which engages the outer face of the endless belt is normally urged towards the same by the springs 74 to take up any slack which may exist in the flexible belt and to insure an efficient operation.

As a means of driving the endless belt carrying the stereoscopic pictures, an electric motor 76 (Fig. 1) having a base 77 is mounted on the outer face of the member 34 by means of the screws 78, the motor including a gear reduction mechanism 79 from which extends the shaft 80. A segment gear 81 is keyed onto the end of the shaft 80 in mesh with gear 41. Preferably the segment gear 81 is provided with the two teeth shown which compares with twenty-two teeth provided on the gear 41. Thus, for every complete revolution of the shaft 80, the gear 41 will make one-eleventh of a revolution. The motor 76 is connected to a suitable source of power by means of insulated wires 82 and the male plug 83.

As a means of automatically stopping the motor 76 after one complete revolution of the gear 41 (and therefore the belt transport sprocket 44), a micro-switch 84 is mounted on the outer face of the member 35 below the cam 43 and disc 42 and includes a roller 85 adapted to be engaged by the cam 43 once during every revolution of disc 42 whereby to open the micro-switch 84. The micro-switch 84 is connected in the circuit of a relay mechanism 86 which acts with micro-switch 84 to stop the motor 76 and turn off the lights 51 and 52 after one complete showing, i.e. after ten mounts 63 have passed below the viewing head 24.

A circuit diagram of the device is shown in Fig. 8. It will be noted that the lamps 51 and 52 are connected in parallel with each other by means of the wires 87, 88 and 89. The circuit of lamps 51 and 52 is connected in parallel with the motor 76 by means of the wires 90, 91, 92 and 93.

One terminal of the male plug 83 is connected to one terminal of the coin switch 33 by means of a wire 94, the other terminal of switch 33 being connected to a terminal 95 by means of wire 96. The other terminal of male plug 83 is connected to one terminal of fuse 97 by means of a wire 98, the other terminal of fuse 97 being connected to terminal 99 by means of wire 100.

The relay 86 includes a pair of normally closed solenoid contacts 101 connected in series with a coin counter 102, the coin counter 102 and solenoid contacts 101 being connected in parallel with the solenoid 103 of the relay between the terminals 95 and 99. The micro-switch 84 includes the contacts 104 and the contacts 105, while the relay 86 includes second solenoid contacts 106 connected in parallel with the micro-switch contacts 104.

In operation, a coin inserted through the slot 31 of the mechanism 30 will momentarily close the electrical switch 33, energizing the coin counter 102 through the normally closed contacts 101 of the solenoid 103. Immediately thereafter the solenoid 103 becomes fully energized, causing contacts 101 to open and contacts 106 to close. The closing of contacts 106 applies a voltage to the motor 76 and lamps 51 and 52. At this point (Fig. 4) the micro-switch 84 is held with the contacts 104 open and the contacts 105 closed by the cam 43. Therefore, immediately after the solenoid contacts 106 close, a circuit is established through contacts 106 and through the closed micro-switch contacts 105 to maintain the solenoid 103 energized.

Since the motor 76 starts to turn after the solenoid contacts 106 close, the cam high point 43 allows the micro-switch to move so that the micro-switch contacts 104 are closed, by-passing solenoid contacts 106 and providing an energizing path for the motor 76 and lamps 51, 52. Also, this movement opens the contacts 105 of the micro-switch, de-energizing the solenoid 103 and closing solenoid contacts 101. When the micro-switch contacts 104 are again opened by a complete revolution of disc 42 and cam 43, the motor 76 will stop and the lamps 51, 52 will go out.

It will be readily apparent that during one complete revolution of the disc 42 or one cycle of operation, the belt transport sprocket 44 will have likewise made one complete revolution and that ten mounts 63 will have passed below the viewing head 24. In order to view the next showing comprising the next ten mounts, it will be necessary to insert another coin in the slot and the cycle of electrical operations described above will be repeated.

The solenoid 103 is, of course, provided with double pull, double throw contacts.

The ratio of the gear 41 to the gear 81 is such that a complete revolution of the gear 41 requires approximately one minute, providing five one-minute showings upon the insertion of five coins.

It should now be apparent that there has been provided a stereoscopic viewer which is completely automatic in operation, easy to service, and is electronically coin operated. It should also be apparent that there have been provided novel slide transport means which may be easily and readily assembled from conventional stereoscopic mounts now on the market and which may be easily and readily mounted and removed during servicing and changing.

While various changes may be made in the detail construction, it shall be understood that such changes shall be within the spirit and scope of the present invention as defined by the appended claims.

What is claimed as new is:

1. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket during rotation of the latter, means for driving said shaft and sprocket, means for automatically stopping said driving means after a predetermined movement of said belt means and stereoscopic viewing means mounted on said housing whereby to observe said stereoscopic slides.

2. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, said housing at the front bottom portion thereof having a recess adapted to accommodate the shoes of the observer.

3. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, said housing having an outwardly opening front panel hingeably mounted within said housing and lock means provided on said panel for securing the same within said housing.

4. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, said housing having an outwardly opening front panel hingeably mounted within said housing, lock means provided on said panel for securing the same within said housing, and a coin receiving mechanism mounted in said front panel, said coin receiving mechanism including a coin receiving slot and a coin return slot.

5. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, said means for driving said shaft and sprocket comprising a gear keyed onto said shaft, an electric motor, a gear reduction mechanism in operative engagement with the drive shaft of said electric motor and including an output shaft, a second gear on said output shaft in mesh with said first gear and means for supplying power to said electric motor.

6. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, said means for driving said shaft and sprocket comprising a gear keyed onto said shaft, an electric motor, a gear reduction mechanism in operative engagement with the drive shaft of said electric motor and including an output shaft, a second gear on said output shaft in mesh with said first gear and means for supplying power to said electric motor, said means for automatically stopping said driving means comprising a disc keyed onto said shaft, a cam on the periphery of said disc, a switch disposed adjacent the periphery of said disc and adapted to be opened by said cam and relay means for automatically stopping said motor upon the opening of said switch.

7. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, and electric light means disposed below said belt means for illuminating said stereoscopic slides.

8. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, and a roller disposed across the outer face of said endless belt means, extensions at each end of said roller, mounting means adapting said extensions for horizontal as well as rotational movement towards and away from said endless belt means, and spring means connected to said extensions urging said roller toward said endless belt means.

9. A stereoscopic viewer comprising a hollow housing, a first idler guide drum rotatably mounted within said housing, a second parallel and spaced idler guide drum rotatably mounted within said housing, an internal shaft rotatably mounted within said housing, a belt transport central sprocket keyed onto said shaft within said housing, an endless resilient and flexible belt having longitudinally spaced openings along the central portion, hollow mounting means engageable with said openings for both mounting a plurality of stereoscopic pictures and for successively receiving the teeth of said belt transport sprocket, during rotation of the latter means for driving said shaft and sprocket, means for automatically stopping said driving means after a predetermined movement of said belt means and stereoscopic viewing means mounted on said housing whereby to observe said stereoscopic slides, and a pair of substantially vertical, laterally spaced members within said housing, said first drum being rotatably mounted intermediate the rear top portion of said members, said second drum being rotatably mounted between the lower portions of said members, the forward longitudinal edges of said members being tapered upwardly and outwardly, said shaft being rotatably mounted between the upper front portion of said members, said viewing head being mounted upon the upper front edges of said members.

References Cited in the file of this patent

UNITED STATES PATENTS

| | | |
|---|---|---|
| 582,311 | Parnaland | May 11, 1897 |
| 698,369 | Burgess | Apr. 22, 1902 |
| 1,193,510 | Carruthers et al. | Aug. 8, 1916 |
| 1,483,025 | Tucker | Feb. 5, 1924 |
| 1,590,704 | Semelroth | June 29, 1926 |
| 1,856,234 | Birdsall | May 3, 1932 |
| 2,318,874 | Mast | May 11, 1943 |
| 2,464,389 | Grau | Mar. 15, 1949 |
| 2,474,843 | Helsing | July 5, 1949 |
| 2,530,531 | McClellan | Nov. 21, 1950 |
| 2,586,176 | Olsen | Feb. 19, 1952 |
| 2,679,705 | Rainous | June 1, 1954 |
| 2,682,722 | Waller et al | July 6, 1954 |

FOREIGN PATENTS

| | | |
|---|---|---|
| 222,940 | Great Britain | Oct. 9, 1924 |